United States Patent
Mase et al.

(10) Patent No.: US 8,670,247 B2
(45) Date of Patent: Mar. 11, 2014

(54) ISOLATED DC-DC CONVERTER WITH ACTIVE CLAMP CIRCUIT

(75) Inventors: Tomoyuki Mase, Aichi-ken (JP); Toyohisa Oyabu, Aichi-ken (JP); Nobuo Hirabayashi, Aichi-kin (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 808 days.

(21) Appl. No.: 12/729,345

(22) Filed: Mar. 23, 2010

(65) Prior Publication Data

US 2010/0246215 A1 Sep. 30, 2010

(30) Foreign Application Priority Data

Mar. 25, 2009 (JP) ................................ 2009-074199

(51) Int. Cl.
*H02M 3/335* (2006.01)
*H02H 7/127* (2006.01)

(52) U.S. Cl.
USPC ........ 363/21.04; 363/49; 363/56.11; 363/125

(58) Field of Classification Search
USPC .......... 363/18–21.11, 49, 52, 53, 56.09, 56.1, 363/56.11, 84, 86, 123, 125, 127; 323/908, 323/238, 266
See application file for complete search history.

(56) References Cited

U.S. PATENT DOCUMENTS

| | | | | |
|---|---|---|---|---|
| 5,327,333 A | * | 7/1994 | Boylan et al. | 363/21.04 |
| 5,392,206 A | * | 2/1995 | Peterson et al. | 363/19 |
| 5,528,482 A | * | 6/1996 | Rozman | 363/21.06 |
| 5,535,112 A | * | 7/1996 | Vazquez Lopez et al. | 363/20 |
| 5,638,262 A | * | 6/1997 | Brown | 363/19 |
| 5,734,563 A | * | 3/1998 | Shinada | 363/21.06 |
| 5,805,434 A | | 9/1998 | Vinciarelli et al. | |
| 5,847,941 A | * | 12/1998 | Taguchi et al. | 363/21.03 |
| 6,038,142 A | * | 3/2000 | Fraidlin et al. | 363/17 |
| 6,061,255 A | * | 5/2000 | Chik et al. | 363/21.06 |
| 6,069,802 A | * | 5/2000 | Priegnitz | 363/21.06 |
| 6,191,960 B1 | * | 2/2001 | Fraidlin et al. | 363/25 |
| 6,580,626 B2 | * | 6/2003 | Takegami | 363/97 |
| 6,587,356 B2 | * | 7/2003 | Zhu et al. | 363/17 |
| 6,618,274 B2 | * | 9/2003 | Boylan et al. | 363/17 |
| 6,760,235 B2 | * | 7/2004 | Lin et al. | 363/21.06 |
| 6,947,297 B2 | * | 9/2005 | Ke et al. | 363/20 |

(Continued)

FOREIGN PATENT DOCUMENTS

JP 2006-191741 7/2006
WO 02/07296 1/2002

*Primary Examiner* — Adolf Berhane
*Assistant Examiner* — Nusrat Quddus
(74) *Attorney, Agent, or Firm* — Greenblum & Bernstein, P.L.C.

(57) ABSTRACT

An isolated DC-DC converter includes a transformer, a main switch, an active clamp circuit and a control unit. The transformer has a primary winding. The main switch and the active clamp circuit are connected to the primary winding. The active clamp circuit has an auxiliary switch and a clamp capacitor connected in series. The control unit is provided for controlling the main switch and the auxiliary switch. The control unit performs a soft start operation of the converter before a normal operation. The control unit performs anti-saturation control before starting the soft start operation. The anti-saturation control includes an act of controlling the main switch and the auxiliary switch so that the auxiliary switch performs ON-OFF operation with the main switch kept OFF until voltage of the clamp capacitor drops below a level at which the transformer is to be magnetically saturated after starting the soft start operation.

10 Claims, 4 Drawing Sheets

(56) References Cited

U.S. PATENT DOCUMENTS

| | | | |
|---|---|---|---|
| 7,710,748 B2 * | 5/2010 | Young | 363/37 |
| 7,902,804 B2 * | 3/2011 | Adragna | 323/284 |
| 2004/0264215 A1 | 12/2004 | Ambo et al. | |
| 2005/0024906 A1 * | 2/2005 | Schlecht | 363/127 |
| 2006/0198173 A1 * | 9/2006 | Rozman | 363/123 |
| 2011/0176336 A1 * | 7/2011 | Weng et al. | 363/21.04 |

* cited by examiner

ISOLATED DC-DC CONVERTER WITH ACTIVE CLAMP CIRCUIT

BACKGROUND OF THE INVENTION

The present invention relates to an isolated DC-DC converter and more particularly to an isolated DC-DC converter with an active clamp circuit.

Referring to FIG. 8 showing the circuit diagram of an isolated DC-DC converter with an active clamp circuit according to background art, the main switch Q1 and the auxiliary switch Q2 are used in the circuit for the primary winding of the transformer 50. The auxiliary switch Q2 is connected in series to a clamp capacitor C thereby to form an active clamp circuit. The active clamp circuit is connected in parallel to the primary winding of the transformer 50. The main switch Q1 and the auxiliary switch Q2 are turned ON and OFF alternately by a control circuit (not shown). A driving signal for the auxiliary switch Q2 is provided by reversing the driving signal for the main switch Q1.

In starting the DC-DC converter with an active clamp circuit, soft start is implemented for preventing bias excitation of the transformer 50.

FIG. 9 shows the timing chart of operation of the isolated DC-DC converter during its soft start period. As shown in the drawing, the duty cycle of the auxiliary switch Q2 is larger than that of the main switch Q1. The term of the duty cycle means the ratio of the time period during which the switch is ON to the sum of the time period during which the switch is ON and the time period during which the switch is OFF. The product Vc·T2, where Vc represents the voltage applied to the transformer 50 and T2 represents the time period during which the auxiliary switch Q2 is ON, is larger than the product V1·T1, where V1 represents the voltage applied to the transformer 50 and T1 represents the time period during which the main switch Q1 is ON. Therefore, depending on the magnitude of electric charge with which the clamp capacitor C is charged at the initiation of soft start of the converter, or on the voltage of the clamp capacitor C, bias excitation is induced and the transformer 50 may be magnetically saturated if the bias excitation is continued. The magnetic saturation of the transformer 50 causes a rapid decrease of its inductance thereby to increase exciting current rapidly, so that excess current flowing through the auxiliary switch Q2 may cause damage to the auxiliary switch Q2. Although the use of a switching element having a capacity to withstand a large voltage and a large current as the auxiliary switch Q2 enables prevention of the damage of the auxiliary switch Q2, it increases the cost of the converter.

Japanese Unexamined Patent Application Publication No. 2006-191741 discloses an isolated DC-DC converter with an active clamp circuit. In this publication, when the control circuit controlling the operation of the main switch and the auxiliary switch is started, power is supplied to the control circuit from the clamp capacitor. Electric charge with which the clamp capacitor is charged in starting the control circuit is transferred to a capacitor forming a power supply of the control circuit, thereby discharging the electric charge stored in the clamp capacitor. Such a converter needs an additional circuit, so that the converter is complicated and its manufacturing cost is increased.

The present invention, which has been made in light of the above problems, is directed to an isolated DC-DC converter with an active clamp circuit, according to which the transformer is prevented from being magnetically saturated after initiating soft start of the isolated DC-DC converter and the switching element having a capacity to withstand a large voltage and a large current as an auxiliary switch of the active clamp circuit is dispensed with.

SUMMARY OF THE INVENTION

In accordance with an aspect of the present invention, an isolated DC-DC converter includes a transformer, a main switch, an active clamp circuit and a control unit. The transformer has a primary winding. The main switch is connected to the primary winding. The active clamp circuit is connected to the primary winding and has an auxiliary switch and a clamp capacitor connected in series. The control unit is provided for controlling the main switch and the auxiliary switch. The control unit performs a soft start operation of the isolated DC-DC converter before a normal operation for supplying power. The control unit performs anti-saturation control before starting the soft start operation of the isolated DC-DC converter. The anti-saturation control includes an act of controlling the main switch and the auxiliary switch so that the auxiliary switch performs ON-OFF operation while the main switch is kept in OFF state until voltage of the clamp capacitor drops below a level at which the transformer is to be magnetically saturated after starting the soft start operation of the isolated DC-DC converter.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE PREFERRED EMBODIMENTS

Figure 1:
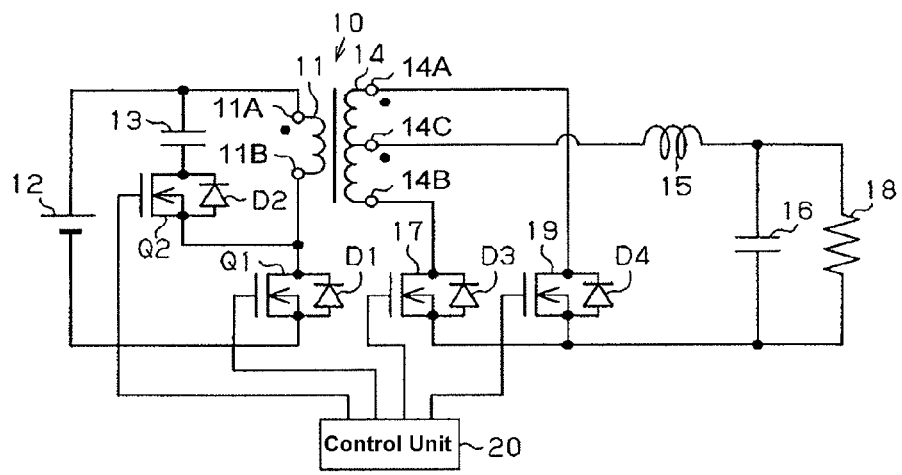
FIG. 1 is a circuit diagram showing an isolated DC-DC converter according to a preferred embodiment of the present invention.
Figure 2:
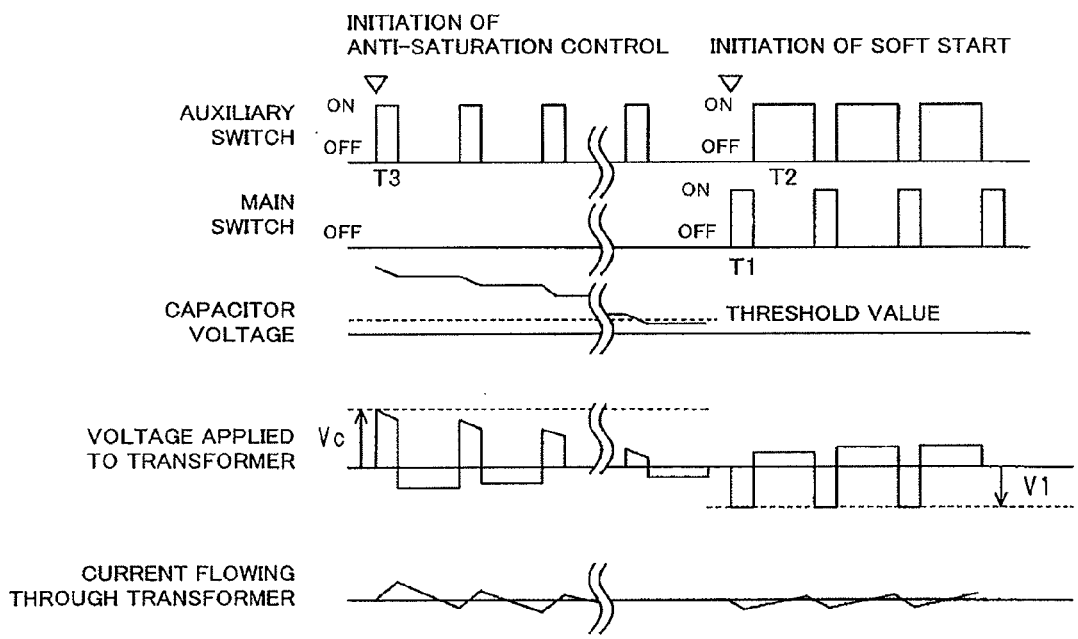
FIG. 2 is a timing chart showing the operation of the isolated DC-DC converter of FIG. 1.

The following will describe the isolated DC-DC converter according to the preferred embodiment of the present invention with reference to FIGS. 1 and 2. In the present embodiment, an active clamp forward converter is employed as the isolated DC-DC converter. The active clamp forward converter will be referred to merely as a converter in the following description. Referring to FIG. 1 showing the converter according to the present embodiment, reference numeral 10 denotes a transformer having a primary winding 11 and a secondary winding 14. The primary winding 11, a main switch Q1 and a direct-current power supply 12 are connected in series. The main switch Q1 uses a metal-oxide-semiconductor field-effect transistor (MOSFET) as a switching element. The first terminal 11A of the primary winding 11 is connected to the positive terminal of the direct-current power supply 12 and the second terminal 11B of the primary winding 11 is connected to the drain of the MOSFET of the main switch Q1. The source of the MOSFET of the main switch Q1 is connected to the negative terminal of the direct-current power supply 12. A diode D1 is connected in antiparallel to the main switch Q1.

An auxiliary switch Q2 and a clamp capacitor 13 are connected in series to form an active clamp circuit. The active clamp circuit is connected in parallel to the primary winding 11. The auxiliary switch Q2 uses a MOSFET as a switching element. The clamp capacitor 13 is connected at one end thereof to the node of the primary winding 11 and the positive terminal of the direct-current power supply 12 and at the other end thereof to the drain of the MOSFET of the auxiliary switch Q2. The MOSFET of the auxiliary switch Q2 is connected at the source thereof to the node of the primary winding 11 and the main switch Q1. A diode D2 is connected in antiparallel to the auxiliary switch Q2.

The secondary winding 14 of the transformer 10 has a first terminal 14A, a second terminal 14B and an intermediate tap 14C. An inductor 15, a capacitor 16 and a MOSFET 17 are connected in series between the intermediate tap 14C and the second terminal 14B. A resistor (load) 18 is connected in parallel to the capacitor 16. The first terminal 14A of the secondary winding 14 is connected to the source of the MOSFET 17 via a MOSFET 19. A diode D3 is connected in antiparallel to the MOSFET 17 and a diode D4 is connected in antiparallel to the MOSFET 19.

The main switch Q1, the auxiliary switch Q2, the MOSFET 17 and the MOSFET 19 are connected at the gate thereof to a control unit 20. The control unit 20 includes a central processing unit (CPU) and a memory. The control unit 20 controls alternate ON-OFF operation of the main switch Q1 and the auxiliary switch Q2 during a normal operation of the converter, thereby supplying power from the direct-current power supply 12 to the transformer 10. The phrase "during the normal operation of the converter" means a state of the converter where electric power of direct-current power supply is supplied from the primary winding 11 of the transformer 10 to the secondary winding 14. The control unit 20 is operable to control complementary ON-OFF operation of the MOSFETs 17 and 19 in synchronization with the change in the direction of the current flowing through the primary winding 11. That is, the MOSFETs 17 and 19 performs alternate ON-OFF operation in a complementary manner.

In starting the converter, the control unit 20 controls ON-OFF operation of the main switch Q1 and the auxiliary switch Q2 so that the converter implements soft start where duty cycle of the auxiliary switch Q2 is larger than that of the main switch Q1. The duty cycle means the ratio of the time period during which the switch is ON to the sum of the time period during which the switch is ON and the time period during which the switch is OFF. When the control unit 20 receives a starting command, the control unit 20 performs anti-saturation control prior to initiating the soft start operation. The anti-saturation control is an act of controlling the operation of the main switch Q1 and the auxiliary switch Q2 such that the auxiliary switch Q2 performs ON-OFF operation with the main switch Q1 kept OFF until the voltage of the clamp capacitor 13 drops below a level at which the transformer 10 is to be magnetically saturated after starting the soft start operation of the converter. The cycle of ON-OFF operation of the auxiliary switch Q2 in the anti-saturation control may be substantially equal to that of the auxiliary switch Q2 during operation of the converter.

If 0 volt is selected as the voltage that is below the level at which the transformer 10 is magnetically saturated after starting the soft start operation of the converter, there is no fear that the transformer 10 is magnetically saturated at after starting the soft start operation of the converter, but it takes a long time to perform the anti-saturation control. Therefore, the minimum value of voltage at which the transformer 10 is magnetically saturated after starting the soft start operation of the converter is found previously by testing and an appropriate voltage value is set with reference to the minimum value in such an extent that the transformer 10 is not magnetically saturated. Timing of termination of the anti-saturation control may be determined by judging whether or not the capacitor voltage has reached the set value by using a voltage detecting circuit that detects the voltage of the clamp capacitor 13. In this case, however, the converter requires the voltage detecting circuit. In the present embodiment, a cumulative ON pulse number representative of number of ON operation times of the auxiliary switch Q2 has been counted from the time of initiation of anti-saturation control. The anti-saturation control is terminated when the cumulative ON pulse number reaches a preset value. The preset value is found previously by testing and an appropriate cumulative ON pulse number is set with reference to the found number of pulses in such an extent that the transformer 10 is not magnetically saturated.

The time period T3 of the auxiliary switch Q2 being ON in the anti-saturation control is set so that the product of the remaining charge of the clamp capacitor 13 and the time period T3 of the auxiliary switch Q2 being ON is smaller than the volt-time product $E \cdot T$, in which a voltage E across the transformer 10 is multiplied by a time period T while the voltage E is applied to the transformer 10.

The following will describe the operation of the above-described converter. In the normal operation or in steady state of the converter, the alternate ON-OFF operation of the main switch Q1 and the auxiliary switch Q2 is performed in such a duty cycle that the product $E \cdot T$ of the transformer 10 when the main switch Q1 is ON is equal to the product $E \cdot T$ of the transformer 10 when the auxiliary switch Q2 is ON. When the main switch Q1 is ON and the auxiliary switch Q2 is OFF, current flows through the primary winding 11 from the first terminal 11A to the second terminal 11B and also through the secondary winding 14 from the second terminal 14B to the first terminal 14A. In this case, the MOSFET 17 is controlled to be in ON state and the MOSFET 19 is controlled to be in OFF state so that the current flowing through the secondary winding 14 is passed through the tap 14C, the inductor 15 and the resistor 18. On the other hand, when the main switch Q1 is OFF and the auxiliary switch Q2 is ON, current flows through the primary winding 11 from the second terminal 11B to the first terminal 11A and also through the secondary winding 14 from the first terminal 14A to the second terminal 14B. In this case, the MOSFET 17 is controlled to be in OFF state and the MOSFET 19 is controlled to be in ON state so that the current flowing through the secondary winding 14 is passed through the tap 14C, the inductor 15 and the resistor 18. That is, when the main switch Q1 and the auxiliary switch Q2 are turned ON and OFF alternately and the direction of current flowing through the primary winding 11 is changed in a predetermined cycle, the MOSFETs 17 and 19 are turned ON and OFF alternately in synchronization with the change in the direction of current flowing through the primary winding 11, with the result that the current occurring in the secondary winding 14 is passed as a direct current through the resistor 18.

When a starting switch (not shown) is turned ON and the control unit 20 receives a restarting command (starting command), the control unit 20 performs the anti-saturation control prior to implementing the soft start. According to the anti-saturation control, the control unit 20 controls the operation of the main switch Q1 and the auxiliary switch Q2 so that the auxiliary switch Q2 performs ON-OFF operation while the main switch Q1 is kept in OFF state until the voltage of the clamp capacitor 13 drops below a level at which the transformer 10 is to be magnetically saturated after restarting the soft start operation of the converter. The control unit 20 counts the pulses when the auxiliary switch Q2 is ON from the initiation of the anti-saturation control. When the number of pulses counted reaches a preset value, the control unit 20 finishes the anti-saturation control and initiates the control of the soft start. In the context of the embodiments described in this Description, "restarting" is a certain type of "starting" operation, which is the starting operation in the case of starting the converter again after a stop of the converter.

Electric charge (voltage) which the clamp capacitor 13 is charged with (or electric charge remaining in the clamp capacitor 13) is discharged during the repetition of ON-OFF operation of the auxiliary switch Q2 and the voltage Vc of the clamp capacitor 13 drops gradually, accordingly, as shown in FIG. 2. In addition, the voltage applied to the transformer 10 and current flowing through the transformer 10 decrease gradually. When the voltage Vc of the clamp capacitor 13 drops below a threshold voltage value, that is, the voltage at which the transformer 10 is to be magnetically saturated after restarting the soft start operation of the converter, it is time to finish the discharging, that is, the anti-saturation control is finished. Then the soft start is going to be initiated.

During the soft start, the duty cycle of the auxiliary switch Q2 is set larger than that of the main switch Q1. By virtue of the anti-saturation control, however, the soft start is initiated in a state where the voltage of the clamp capacitor 13 is sufficiently low. Therefore, the transformer 10 is not excited with large bias so as to be magnetically saturated, even though the product Vc·T2 of the voltage Vc applied to the transformer 10 during the time period T2 which the voltage Vc is applied to the transformer 10 is imbalanced with the product V1·T1 of the voltage V1 applied to the transformer 10 during the time period T1 which the voltage V1 is applied to the transformer 10.

The present embodiment offers the following advantageous effects.

(1) The converter includes a transformer 10, a main switch Q1, an active clamp circuit and a control unit 20. The active clamp circuit is connected in parallel to the primary winding 11 of the transformer 10 and has an auxiliary switch Q2 and a clamp capacitor 13 connected in series. The control unit 20 controls the operation of the main switch Q1 and the auxiliary switch Q2. The control unit 20 performs the soft start operation of the converter before the normal operation for supplying power. The control unit 20 performs anti-saturation control before restarting the soft start operation of the converter after a stop of the converter. The phrase "a stop of the converter" means to stop applying voltage to the primary winding 11 of the transformer 10, in which at least the main switch Q1 is turned OFF. For example, the auxiliary switch Q2 is turned ON and OFF while the main switch Q1 is turned OFF. The anti-saturation control is an act of controlling operation of the main switch Q1 and the auxiliary switch Q2 so that the auxiliary switch Q2 performs ON-OFF operation with the main switch Q1 kept OFF until the voltage of the clamp capacitor 13 drops below a level at which the transformer 10 is to be magnetically saturated after restarting the soft start operation of the converter. Therefore, if the converter is restarted by soft start and the auxiliary switch Q2 is operated in a duty cycle that is larger than that of the main switch Q1, the transformer 10 is not magnetically saturated because the initial voltage of the clamp capacitor 13 is sufficiently low. Thus, it is unnecessary to use a switching element having a capacity to withstand a large voltage and a large current as the auxiliary switch Q2 of the active clamp circuit.

(2) The control unit 20 performs the anti-saturation control before restarting the soft start operation of the converter after a stop of the converter. Therefore, it is not necessary to measure the time elapsed from the stop of the converter, as compared to the case where the anti-saturation control is performed at any given time before the converter is restarted after a stop of the converter. Thus, the control unit 20 performs the anti-saturation control without fail before restarting of the converter.

(3) The time period T3 during which the auxiliary switch Q2 is ON under the anti-saturation control is so set that the product of the remaining charge of the clamp capacitor 13 and the time period T3 during which the auxiliary switch Q2 is ON is smaller than the product E·T, that is the product of the voltage E applied to the transformer 10 and the time period T during which the voltage E is applied to the transformer 10. Therefore, there is no fear that the transformer 10 reaches the saturation flux density in discharging the clamp capacitor 13.

(4) The control unit 20 determines the timing of termination of the anti-saturation control not by judging whether or not the capacitor voltage has reached the set value by using a voltage detecting circuit that detects the voltage of the clamp capacitor 13, but by judging whether or not the cumulative ON pulse number representing ON operation times of the auxiliary switch Q2 has reached a preset value from the initiation of anti-saturation control. Therefore, the control unit 20 does not need a voltage detecting circuit and achieves the object by simply modifying the control program for the main switch Q1 and the auxiliary switch Q2 rather than modifying hardware.

(5) In establishing a voltage that is below the voltage at which the transformer 10 is to be magnetically saturated after restarting the soft start operation of the converter, minimum value of the magnetically saturating voltage is found previously by testing and a voltage that is other than 0 volt is set with reference to the found minimum value in such an extent that the transformer 10 is not magnetically saturated. Therefore, the time required for the anti-saturation control is reduced as compared to the case where the anti-saturation control is performed until the voltage of the clamp capacitor 13 reaches 0 volt.

(6) The cycle of ON-OFF operation of the auxiliary switch Q2 in the anti-saturation control is equal to that during operation of the converter. Therefore, no additional drive circuit is needed for controlling the ON-OFF operation of the auxiliary switch Q2 under the anti-saturation control.

The present invention has been described in the context of the above-described embodiment, but it is not limited to the embodiment. It is obvious that the invention may be practiced in various manners as exemplified below.

Figure 3:
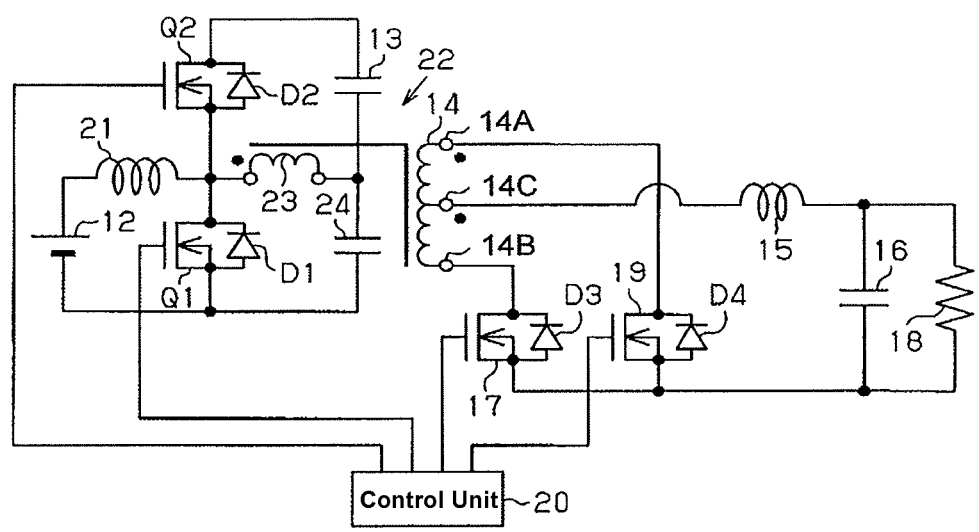
FIG. 3 is a circuit diagram showing an isolated DC-DC converter according to another embodiment of the present invention.

In the modification of the above-described embodiment as shown in FIG. 3, the isolated DC-DC converter of the present invention is applied to a boost half-bridge converter. In this instance, the secondary circuit of the transformer 22 is substantially the same as that of the transformer 10, but the primary circuit of the transformer 22 differs from that of the transformer 10. An inductor 21, the main switch Q1 and the direct-current power supply 12 are connected in series. In addition, a series circuit of the primary winding 23 of the transformer 22 and the capacitor 24 is connected in parallel to the main switch Q1. A series circuit of the clamp capacitor 13 and the auxiliary switch Q2 is connected in parallel to the primary winding 23 of the transformer 22. Diodes D1 and D2 are connected in antiparallel to the main switch Q1 and to the auxiliary switch Q2, respectively.

Figure 4:
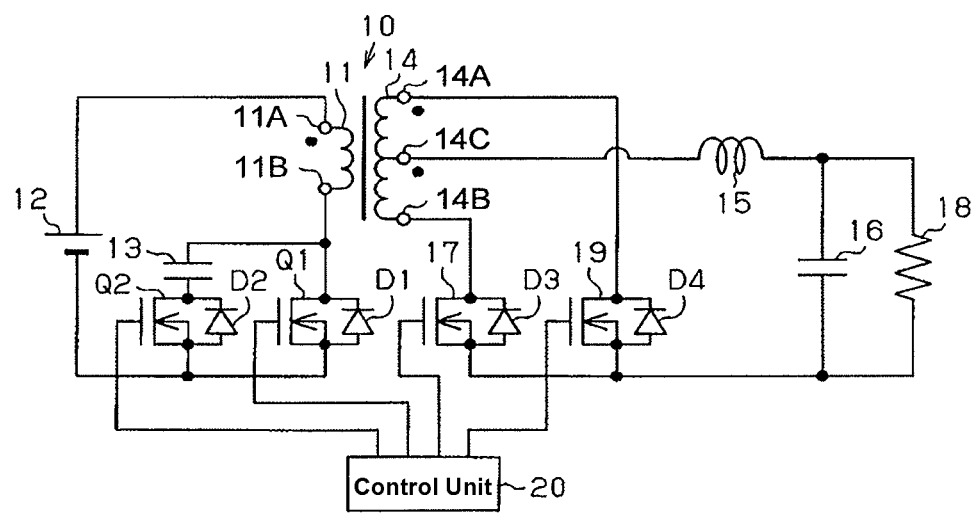
FIG. 4 is a circuit diagram showing an isolated DC-DC converter according to yet another embodiment of the present invention.

In the active clamp forward converter of the above-described embodiment, it may be so arranged that the series circuit of the active clamp circuit, which has the clamp capacitor 13 and the auxiliary switch Q2, is connected in parallel to the main switch Q1 as shown in FIG. 4, rather than to the primary winding 11.

Figure 5:
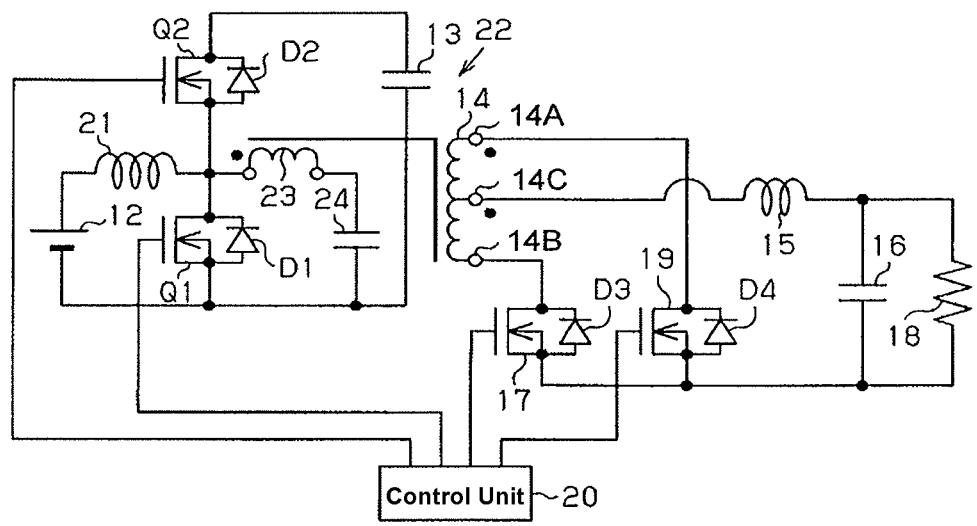
FIG. 5 is a circuit diagram showing an isolated DC-DC converter according to yet another embodiment of the present invention.

In a modification of the above-described boost half-bridge converter, it may be so arranged that the series circuit of the active clamp circuit, which has the clamp capacitor 13 and the auxiliary switch Q2, is connected in parallel to a series circuit of the primary winding 23 and the capacitor 24 as shown in FIG. 5, rather than to the primary winding 23.

Figure 6:
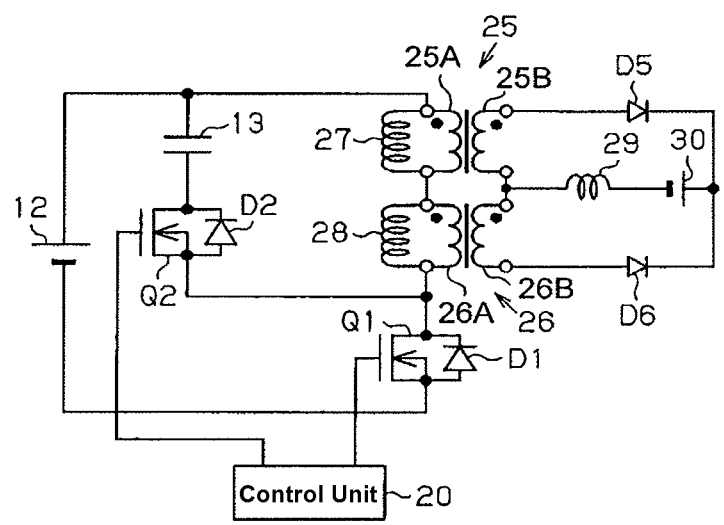
FIG. 6 is a circuit diagram showing an isolated DC-DC converter according to yet another embodiment of the present invention.

In a modification of the above-described embodiment, the isolated DC-DC converter of the present invention may be applied to an active clamp forward converter in the form of a two-transformer arrangement having two separate transformers 25 and 26 as shown in FIG. 6. A primary winding 25A of the transformer 25, a primary winding 26A of the transformer 26, the main switch Q1 and the power supply 12 are connected in series. A series circuit of the clamp capacitor 13 and the auxiliary switch Q2 is connected in parallel to a series circuit of the primary winding 25A of the transformer 25 and the primary winding 26A of the transformer 26. An inductor 27 is connected in parallel to the primary winding 25A of the transformer 25 and an inductor 28 is connected in parallel to the primary winding 26A of the transformer 26. The diode D1 is connected in antiparallel to the main switch Q1 and the diode D2 is connected in antiparallel to the auxiliary switch Q2. A secondary winding 25B of the transformer 25 and a secondary winding 26B of the transformer 26 are connected in series, and a power supply 30 is connected at the negative terminal thereof via an inductor 29 to the node of both secondary windings 25B and 26B. A diode D5 is connected between the positive terminal of the power supply 30 and the secondary winding 25B of the transformer 25 so that the cathode of the diode D5 corresponds to the positive terminal of the power supply 30. A diode D6 is connected between the positive terminal of the power supply 30 and the secondary winding 26B of the transformer 26 so that the cathode of the diode D6 corresponds to the positive terminal of the power supply 30.

Figure 7:
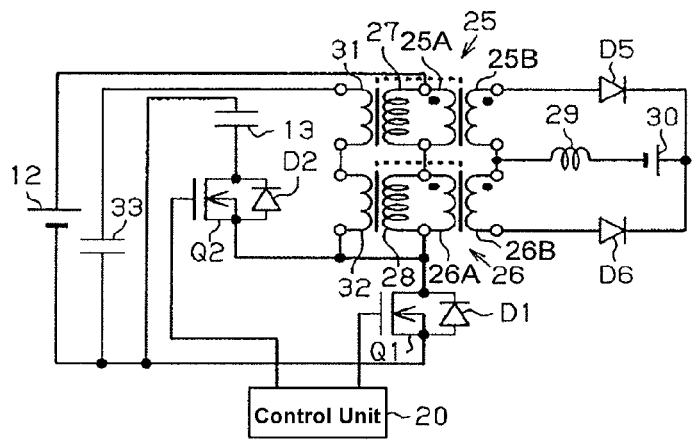
FIG. 7 is a circuit diagram showing an isolated DC-DC converter according to yet another embodiment of the present invention.
Figure 8:
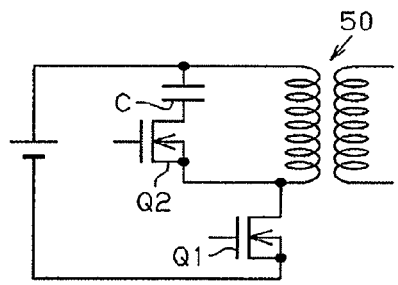
FIG. 8 is a circuit diagram showing an isolated DC-DC converter according to background art.
Figure 9:
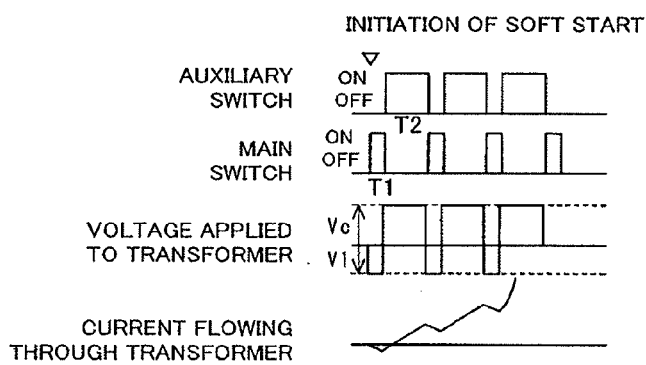
FIG. 9 is a timing chart showing the operation of the isolated DC-DC converter of FIG. 8 during its soft start period.

In a modification of the above-described active clamp forward converter in the form of a two-transformer arrangement, it may be so arranged that the transformer 25 has another primary winding 31 in addition to the primary winding 25A and the transformer 26 has another primary winding 32 in addition to the primary winding 26A, as shown in FIG. 7. A series circuit of the two primary windings 31 and 32 is connected at one end thereof to the negative terminal of the power supply 12 via the capacitor 33 and at the other end thereof to the drain of the MOSFET of the main switch Q1. A series circuit of the clamp capacitor 13 and the auxiliary switch Q2 is connected at one end of the clamp capacitor 13 that is away from the auxiliary switch Q2 to the negative terminal of the power supply 12 and the source of the MOSFET of the auxiliary switch Q2 is connected to the drain of the MOSFET of the main switch Q1.

The time at which the control unit 20 performs the anti-saturation control may be at any time before restarting the soft start operation of the converter after a stop of the converter. The anti-saturation control may be performed just after a stop of the converter or after elapse of a predetermined period of time of the stop of the converter.

Discharging of the clamp capacitor 13 may be terminated when the capacitor voltage has become 0 volt under the anti-saturation control. In this case, however, it takes a long time for the capacitor voltage to become 0 volt.

According to the present invention, it is not necessary to keep the duty cycle of the auxiliary switch Q2 at a constant value in the anti-saturation control. For example, the duty cycle may be increased progressively or stepwise.

The timing of termination of the anti-saturation control may be determined according to the time elapsed from the initiation of the anti-saturation control rather than according to the cumulative On pulse number representing ON operation times of the auxiliary switch Q2 from the initiation of the anti-saturation control. The time required for the capacitor voltage to drop below a level at which the transformer is to be magnetically saturated after restarting the soft start operation of the converter from the initiation of the ON-OFF operation of the auxiliary switch Q2 according to the anti-saturation control is found previously by testing and the time for termination is set with reference to the time found from the testing in such an extent that the transformer is not magnetically saturated. In this case, a voltage detecting circuit is unnecessary as in the case where the timing of termination of the anti-saturation control is determined according to the cumulative ON pulse number representing ON operation times of the auxiliary switch Q2 from the initiation of the anti-saturation control.

The voltage of the clamp capacitor 13 may be detected in the anti-saturation control so that the anti-saturation control terminates when the detected capacitor voltage drops below a preset level. In a method for detecting the voltage of the clamp capacitor 13, a voltage detecting circuit is required. However, it is not necessary to find previously by testing the time to elapse or the cumulative pulse number necessary for the voltage of the clamp capacitor 13 to drop below a voltage level at which the transformer is to be magnetically saturated after restarting the soft start operation of the converter from the initiation of the anti-saturation control.

The switching element of the main switch Q1 and the auxiliary switch Q2 is not limited to the MOSFET, but it may be an insulated gate bipolar transistor (IGBT).

What is claimed is:
1. An isolated DC-DC converter, comprising:
a transformer having a primary winding;
a main switch connected to the primary winding;
an active clamp circuit connected to the primary winding, wherein the active clamp circuit has an auxiliary switch and a clamp capacitor being connected in series; and
a controller for controlling the main switch and the auxiliary switch,
wherein the controller performs a soft start operation of the isolated DC-DC converter before a normal operation for supplying power, wherein the controller performs anti-saturation control before starting the soft start operation of the isolated DC-DC converter, and wherein the anti-saturation control includes an act of controlling the main switch and the auxiliary switch so that the auxiliary switch repeats ON-OFF operation while the main switch is kept in OFF state until voltage of the clamp capacitor drops below a level at which the transformer is to be magnetically saturated after starting the soft start operation of the isolated DC-DC converter.

2. The isolated DC-DC converter according to claim 1, wherein the controller performs the anti-saturation control before restarting the soft start operation of the isolated DC-DC converter after a stop of the isolated DC-DC converter.

3. The isolated DC-DC converter according to claim 1, wherein a time period of the auxiliary switch being ON in the anti-saturation control is set so that product of remaining charge of the clamp capacitor and the time period of the auxiliary switch being ON is smaller than volt-time product E·T in which a voltage E across the transformer is multiplied by a time period T while the voltage E is applied to the transformer.

4. The isolated DC-DC converter according to claim 1, wherein a cycle of the ON-OFF operation of the auxiliary switch in the anti-saturation control is equal to a cycle of the ON-OFF operation of the auxiliary switch during the normal operation of the isolated DC-DC converter.

5. The isolated DC-DC converter according to claim 1, wherein the controller maintains the anti-saturation control until a cumulative pulse number of the auxiliary switch from initiation of the anti-saturation control reaches a preset number of times.

6. The isolated DC-DC converter according to claim 1, wherein the controller maintains the anti-saturation control until time from initiation of the anti-saturation control reaches a preset time.

7. The isolated DC-DC converter according to claim 1, wherein the controller maintains the anti-saturation control until the voltage of the clamp capacitor detected by a voltage detecting circuit drops below a preset level.

8. The isolated DC-DC converter according to claim 1, wherein the voltage of the clamp capacitor dropping below the level at which the transformer is to be magnetically saturated is above zero.

9. The isolated DC-DC converter according to claim 1, wherein the isolated DC-DC converter is an active clamp forward converter having a single or two separate transformers.

10. The isolated DC-DC converter according to claim 1, wherein the isolated DC-DC converter is a boost half-bridge converter, and wherein the clamp circuit is connected in parallel to either the primary winding or a series circuit of the primary winding and a capacitor.

* * * * *